(12) United States Patent
Ensling et al.

(10) Patent No.: US 10,516,282 B2
(45) Date of Patent: Dec. 24, 2019

(54) SECONDARY ELECTROCHEMICAL CELL AND CHARGING METHOD

(71) Applicant: Varta Microbattery GmbH, Ellwangen (DE)

(72) Inventors: David Ensling, Ellwangen (DE); Edward Pytlik, Ellwangen (DE); Stefanie Scholz, Ellwangen (DE); Claudio Schula, Ellwangen (DE)

(73) Assignee: VARTA Microbattery GmbH, Ellwangen Jagst (DE)

(*) Notice: Subject to any disclaimer, the term of this patent is extended or adjusted under 35 U.S.C. 154(b) by 54 days.

(21) Appl. No.: 15/324,302

(22) PCT Filed: Jul. 9, 2015

(86) PCT No.: PCT/EP2015/065765
§ 371 (c)(1),
(2) Date: Jan. 6, 2017

(87) PCT Pub. No.: WO2016/005528
PCT Pub. Date: Jan. 14, 2016

(65) Prior Publication Data
US 2017/0194795 A1 Jul. 6, 2017

(30) Foreign Application Priority Data

Jul. 9, 2014 (EP) .................................. 14176415
Nov. 13, 2014 (DE) .................... 10 2014 223 194

(51) Int. Cl.
*H01G 11/32* (2013.01)
*H02J 7/00* (2006.01)
(Continued)

(52) U.S. Cl.
CPC ............ *H02J 7/007* (2013.01); *H01G 11/32* (2013.01); *H01G 11/46* (2013.01); *H01G 11/52* (2013.01);
(Continued)

(58) Field of Classification Search
CPC .............................. H01G 11/32; H01G 11/46
See application file for complete search history.

(56) References Cited

U.S. PATENT DOCUMENTS 3,977,906 A 8/1976 Beatty
4,246,326 A 1/1981 Sprengel et al.
(Continued)

FOREIGN PATENT DOCUMENTS

CN 101383226 A 3/2009
CN 102324320 A 1/2012
(Continued)

OTHER PUBLICATIONS

JPO English abstract for JP2012-64590. (Year: 2012).*
(Continued)

*Primary Examiner* — Olatunji A Godo
(74) *Attorney, Agent, or Firm* — DLA Piper LLP (US)

(57) ABSTRACT

A secondary electrochemical cell includes a negative electrode including as an output conductor, a metallic or metal-coated open-pore form or a metallic or metal-coated nonwoven, as a carbon-based storage material that enables storage of electrical charge in the electrode through formation of an electrical double layer (Helmholtz double layer), activated carbon having a BET surface area of at least 800 m$^2$/g, a non-carbon-based H2 storage material that can chemisorb hydrogen and/or store it as a metal hydride, a positive electrode including as an output conductor, a metallic or metal-coated open-pore form or a metallic or metal-coated nonwoven, and nickel hydroxide and/or nickel oxy-
(Continued)

hydroxide, a porous separator that separates the negative electrode and the positive electrode from one another, an aqueous alkaline electrolyte with which the electrodes and the separator are soaked, and a housing that encases the electrodes, the separator and the electrolyte.

16 Claims, 2 Drawing Sheets

(51) Int. Cl.
| | |
|---|---|
| H01M 4/32 | (2006.01) |
| H01M 4/583 | (2010.01) |
| H01M 10/34 | (2006.01) |
| H01M 10/52 | (2006.01) |
| H01M 10/24 | (2006.01) |
| H01M 12/00 | (2006.01) |
| H01M 4/24 | (2006.01) |
| H01M 10/30 | (2006.01) |
| H01G 11/46 | (2013.01) |
| H01G 11/52 | (2013.01) |
| H01G 11/60 | (2013.01) |
| H01G 11/82 | (2013.01) |
| H01G 11/74 | (2013.01) |
| H01G 11/78 | (2013.01) |
| H01M 4/52 | (2010.01) |
| H01M 10/44 | (2006.01) |
| H01M 4/36 | (2006.01) |
| H01M 4/48 | (2010.01) |
| H01M 10/26 | (2006.01) |
| H01M 10/42 | (2006.01) |
| H01M 4/38 | (2006.01) |
| H01G 11/30 | (2013.01) |
| H02J 7/34 | (2006.01) |
| H01M 4/02 | (2006.01) |

(52) U.S. Cl.
CPC ............ *H01G 11/60* (2013.01); *H01G 11/74* (2013.01); *H01G 11/78* (2013.01); *H01G 11/82* (2013.01); *H01M 4/24* (2013.01); *H01M 4/32* (2013.01); *H01M 4/52* (2013.01); *H01M 4/583* (2013.01); *H01M 10/24* (2013.01); *H01M 10/30* (2013.01); *H01M 10/34* (2013.01); *H01M 10/443* (2013.01); *H01M 10/52* (2013.01); *H01M 12/005* (2013.01); *H02J 7/0091* (2013.01); *H01G 11/30* (2013.01); *H01M 4/242* (2013.01); *H01M 4/248* (2013.01); *H01M 4/364* (2013.01); *H01M 4/38* (2013.01); *H01M 4/383* (2013.01); *H01M 4/48* (2013.01); *H01M 10/26* (2013.01); *H01M 2004/021* (2013.01); *H01M 2010/4292* (2013.01); *H01M 2300/0002* (2013.01); *H01M 2300/0014* (2013.01); *H02J 7/345* (2013.01)

(56) References Cited

U.S. PATENT DOCUMENTS

| | | | |
|---|---|---|---|
| 4,897,324 | A | 1/1990 | Glaser |
| 5,032,475 | A | 7/1991 | Hasebe et al. |
| 5,122,426 | A | 6/1992 | Simon et al. |
| 6,312,848 | B1 | 11/2001 | Kilb et al. |
| 2003/0232241 | A1 | 12/2003 | Woehrle et al. |
| 2006/0029864 | A1 | 2/2006 | Matsumoto et al. |
| 2006/0201801 | A1 | 9/2006 | Bartlett et al. |
| 2013/0196222 | A1 | 8/2013 | Brenner et al. |
| 2015/0225245 | A1 | 8/2015 | Gadkaree et al. |

FOREIGN PATENT DOCUMENTS

| | | | |
|---|---|---|---|
| DE | 28 26 780 | A1 | 1/1980 |
| DE | 20 2004 017 545 | U1 | 2/2005 |
| DE | 10 2010 012 977 | A1 | 9/2011 |
| EP | 0 218 028 | A2 | 4/1987 |
| EP | 0 303 793 | A2 | 2/1989 |
| EP | 0 416 244 | A2 | 3/1991 |
| EP | 0 419 220 | A1 | 3/1991 |
| EP | 0 460 424 | A2 | 12/1991 |
| EP | 0 658 949 | A1 | 6/1995 |
| EP | 1 011 163 | A1 | 6/2000 |
| EP | 1 100 141 | A1 | 5/2001 |
| EP | 1 139 464 | A2 | 10/2001 |
| EP | 1 391 947 | A1 | 2/2004 |
| JP | 2012-64590 | A | 3/2012 |
| WO | 03/088374 | A2 | 10/2003 |

OTHER PUBLICATIONS

Machine-assisted English translation for JP2012-64590. (Year: 2012).*
Machine-assisted English translation for EP0460424 (Year: 1991).*
EPO English abstract for EP0460424 (Year: 1991).*
Xiao-feng Wang et al., "Appliction of spherical Ni(Oh)$_2$/CNTs composite electrode in asymmetric supercapacitor" Transactions of Nonferrous Metals Society of China, 2006, pp. 1129-1134.
European Search Report in corresponding Application No. 14 17 6415, dated Jan. 6, 2015.
Official Action dated Dec. 19, 2018, of related U.S. Appl. No. 15/324,326.
Second Office Action dated Jun. 20, 2009, of counterpart Chinese Application No. 201580037281.0. along with an English translation.
Official Action dated Jul. 25, 2009, of related U.S. Appl. No. 15/324,326.

* cited by examiner

SECONDARY ELECTROCHEMICAL CELL AND CHARGING METHOD

TECHNICAL FIELD

This disclosure relates to a secondary electrochemical cell and a method of charging such a cell.

BACKGROUND

Electrochemical cells based on nickel/iron in the form of the nickel/iron accumulator (Edison accumulator) have long been known. The electrode reactions in the charging and discharging of an electrochemical element based on nickel/iron can be described by equations (1) and (2):

Charging $$2Ni(OH)_2 + 2OH^- \rightarrow 2NiO(OH) + 2H_2O + 2e^-$$

$$Fe(OH)_2 + 2e^- \rightarrow Fe + 2OH^- \quad (1)$$

Discharging $$2NiO(OH) + 2H_2O + 2e^- \rightarrow 2Ni(OH)_2 + 2OH^-$$

$$Fe + 2OH^- \rightarrow Fe(OH)_2 + 2e^- \quad (2).$$

The electrolyte used is generally potassium hydroxide solution.

Nickel-iron accumulators are very reliable and have a long life, but they are generally unsuitable as sources for high-intensity pulsed currents. Accumulators of better suitability for the purpose, in the form of rechargeable nickel-metal hydride batteries, are described, for example, in EP 1 011 163 A1. The electrode reactions in the charging and discharging of nickel-metal hydride batteries can be described by equations (3) and (4):

Charging $$Ni(OH)_2 + OH^- \rightarrow NiO(OH) + H_2O + e^-$$

$$M + H_2O + e^- \rightarrow M-H + OH^- \quad (3)$$

Discharging $$NiO(OH) + H_2O + e^- \rightarrow Ni(OH)_2 + OH^-$$

$$M-H + OH^- \rightarrow M + H_2O + e^- \quad (4).$$

Here too, potassium hydroxide solution is frequently used as electrolyte.

The nickel-metal hydride batteries described in EP 1 011 163 A1 are suitable to safeguard volatile memory in data processing units, an application where high currents have to be provided within a very short time.

Energy sources used to safeguard volatile memory in data processing units may also be capacitors, especially what are called double layer capacitors ("super-caps"). One example can be found in DE 20 2004 017 545 U1. Double layer capacitors have the advantage that they can deliver very high pulsed currents very quickly. However, their capacity is limited in accordance with the nature of a capacitor. Furthermore, most double layer capacitors have an organic electrolyte system which can constitute a safety risk in the event of overcharging.

The batteries described in EP 1 011 163 A1 have a much higher capacity than double layer capacitors. However, the relatively high temperatures that prevail in operation in data processing units can easily lead to overcharging. There is generally no safety risk associated therewith. However, the overcharging can lead to a decrease in the life expectation of the batteries.

It could therefore be helpful to provide an energy source that can release pulsed currents of high intensity and attenuates or removes the above-stated disadvantages.

SUMMARY

We provide a secondary electrochemical cell including a negative electrode containing as an output conductor, a metallic or metal-coated open-pore form or a metallic or metal-coated nonwoven, as a carbon-based storage material that enables storage of electrical charge in the electrode through formation of an electrical double layer (Helmholtz double layer), activated carbon having a BET surface area of at least 800 m²/g, a non-carbon-based H2 storage material that can chemisorb hydrogen and/or store it as a metal hydride, a positive electrode containing as an output conductor, a metallic or metal-coated open-pore foam or a metallic or metal-coated nonwoven, and nickel hydroxide and/or nickel oxyhydroxide, a porous separator that separates the negative electrode and the positive electrode from one another, an aqueous alkaline electrolyte with which the electrodes and the separator are soaked, and a housing that encases the electrodes, the separator and the electrolyte.

We also provide a method of charging the electrochemical cell including a negative electrode containing as an output conductor, a metallic or metal-coated open-pore form or a metallic or metal-coated nonwoven, as a carbon-based storage material that enables storage of electrical charge in the electrode through formation of an electrical double layer (Helmholtz double layer), activated carbon having a BET surface area of at least 800 m²/g, a non-carbon-based H2 storage material that can chemisorb hydrogen and/or store it as a metal hydride, a positive electrode containing as an output conductor, a metallic or metal-coated open-pore foam or a metallic or metal-coated nonwoven, and nickel hydroxide and/or nickel oxyhydroxide, a porous separator that separates the negative electrode and the positive electrode from one another, an aqueous alkaline electrolyte with which the electrodes and the separator are soaked, and a housing that encases the electrodes, the separator and the electrolyte, wherein, during a charging operation, the ambient temperature and/or the temperature of the electrochemical element is measured and, upon exceeding a selected temperature threshold, the loading voltage is lowered a value of 0.6 mV/° C. to 1.8 mV/° C.

DETAILED DESCRIPTION

Figure 1:
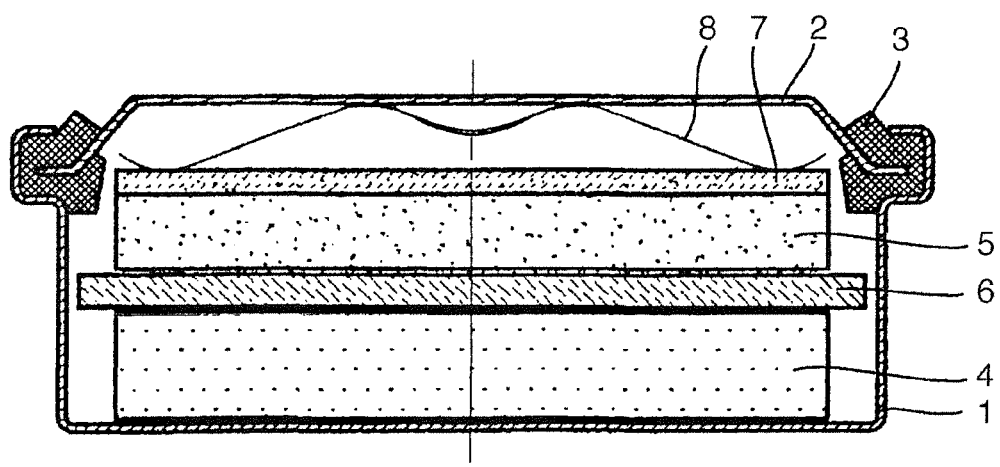
FIG. 1 shows, in schematic form, construction of an example of an electrochemical element.

Our electrochemical cells described hereinafter have a negative electrode, a positive electrode, a porous separator that separates the negative electrode and the positive electrode, an aqueous alkaline electrolyte with which the electrodes and the separator are soaked, and a housing that encases the electrodes, the separator and the electrolyte. The cells are secondary electrochemical cells. In other words, charging and discharging operations are reversible.

There are various examples of the negative electrode of the electrochemical cells:

In Cells According to Example 1—Negative Electrode Capable of Forming an Electrical Double Layer The negative electrode comprises an output conductor and a carbon-based storage material that enables storage of electrical charge in the electrode by formation of an electrical double layer (Helmholtz double layer).

In Cells According to Example 2—Negative Electrode with Pseudocapacity

The negative electrode comprises, as well as an output conductor and a carbon-based storage material that enables the storage of electrical charge in the electrode through formation of the electrical double layer mentioned, a non-carbon-based storage material that can chemisorb hydrogen and/or store it in the form of a metal hydride (referred to hereinafter as H2 storage material).

In Cells According to Example 3—Negative Electrode with Pseudocapacity

The negative electrode comprises, as well as an output conductor and a carbon-based storage material that enables storage of electrical charge in the electrode through formation of the electrical double layer mentioned (and as an alternative to the non-carbon-based storage material according to example 2), iron in metallic form (oxidation state 0) and/or in oxidized form (oxidation state 2 or 3). When the iron is in oxidized form, it is preferably present as iron hydroxide in the electrode. As can be inferred from equations (1)-(4), the equilibrium between the oxidized form and metallic form shifts in the course of charging and discharging.

In the presence of a combination of the carbon-based storage material and the non-carbon-based H2 storage material or the iron (examples 2 and 3), the negative electrode is capable of storing electrical charge not just through formation of the double layer mentioned. Instead, electrical charge can also be stored chemically via the alternative route of a reversible redox reaction. In short: in these cases, the negative electrode may have pseudocapacitative properties.

The positive electrode of the electrochemical cells in all cases contains an output conductor and additionally nickel hydroxide ($Ni(OH)_2$) and/or nickel oxyhydroxide (NiO(OH)).

In the course of charging of the positive electrode, nickel hydroxide is converted to nickel oxyhydroxide with absorption of a hydroxide ion and release of a water molecule and electrons. Conversely, nickel oxyhydroxide, in the course of discharging, absorbs an electron and is converted with water to nickel hydroxide with release of a hydroxide ion. It is thus theoretically possible that a positive electrode comprises exclusively nickel oxyhydroxide in the fully charged state, and exclusively nickel hydroxide in the fully discharged state. In practice, however, the two compounds are usually present alongside one another in electrodes, the ratio of the compounds relative to one another being dependent on the charge state of the electrodes.

Auxiliary Electrode

Preferably, the cells, in all variations, may have an auxiliary electrode electrically connected to the respective negative electrode to dissipate any positive oxygen pressure that arises in a housing of the cell. Auxiliary electrodes of this kind are known for other electrochemical systems. For example, EP 0 218 028 A1 describes an auxiliary electrode for a nickel/cadmium accumulator.

The auxiliary electrode may, for example, be a three-layer electrode composed of a hydrophobic and electrically non-conductive first layer that promotes the ingress of oxygen, a hydrophilic second layer and a hydrophobic third layer that supports catalytic reduction of oxygen and is in electrical contact with the negative main electrode. Such a three-layer electrode is known from EP 0 416 244 A1. The third layer accordingly preferably consists of an activated carbon-containing rolling mixture (for example, composed of 50% by weight to 80% by weight of activated carbon, 3% by weight to 20% by weight of conductive black and 10% by weight to 30% by weight of polytetrafluoroethylene (PTFE)). The first and second layers are preferably based on a single-ply polymer fiber nonwoven, with an aqueous cellulose ether mixture applied to one side thereof. Details thereof can be found in EP 0 416 244 A1.

More preferably, the auxiliary electrode may also take the form of a one-layer electrode. For dissipation of any oxygen pressure that arises in the housing, it is possible to apply, for example, a mixture of activated carbon, carbon black and polytetrafluoroethylene (PTFE) to the negative electrode, for example, as a layer in a thickness of 50 to 100 μm.

Further preferably, the auxiliary electrode, as well as the components mentioned, like the respective negative electrode to which it is electrically connected, may also have a proportion of iron in metallic and/or oxidized form or a proportion of the non-carbon-based H2 storage material.

The auxiliary electrode in the cell has bifunctional character. First, as already mentioned, it can contribute to dissipation of any positive oxygen pressure that arises in the housing. Second, however, particularly because of the proportion of activated carbon and carbon black, like the negative electrode, it is capable of storing electrical charge. It thus increases the double layer capacity on the anode side.

It is preferable that the positive electrode of the cells has a smaller absolute capacity than the negative electrode. In other words, the capacity of the negative electrode for absorption of electrical energy preferably exceeds the capacity of the positive electrode in this regard. This is especially true when the cells have the auxiliary electrode mentioned. In this case, it is preferable that the added absolute capacities of the negative electrode and the auxiliary electrode exceed the absolute capacity of the positive electrode.

Preferably, the capacity of the negative electrode exceeds that of the positive electrode at least by a factor of 1.1, preferably by a factor in the range from 1.1 to 2.0. In the event of overcharging of the cell, it is thus ensured that oxygen will be formed and not, for instance, hydrogen.

Compared to conventional nickel-iron accumulators and nickel-metal hydride batteries, the new developments described here, even without the presence of the auxiliary electrode, have elevated overcharge stability at high temperatures. The auxiliary electrode enhances this effect. The elevated overcharge stability of the cell seems to be attributable especially to the carbon-based storage material in the negative electrode, which can contribute to consumption of oxygen that has arisen as a result of overcharging.

As a result of the overcharge stability, it is possible for the housing of the cell to have a gas- and liquid-tight configuration. Preferably, cells having such a housing also have an auxiliary electrode as described above.

A gas-tight seal in this context means that gas formed in the cell cannot escape from the housing in normal operation. The housing thus generally does not comprise any means of controlled ventilation, for example, a valve. However, for safety reasons, a burst membrane may be provided, which is irreversibly destroyed upon exceeding a pressure threshold.

Negative Electrode

Preferably, the negative electrode of the electrochemical cells, in all variations, comprises the carbon-based storage material in a proportion of at least 5% by weight.

Particularly preferably, the negative electrode may contain the carbon-based storage material in a proportion of more than 5% by weight. More preferably, this proportion is 5% by weight to 100% by weight, preferably 5% by weight to 90% by weight, further preferably 5% by weight to 75% by weight, especially 5% by weight to 50% by weight. Within the latter range, preference is further given to proportions by weight of 5% by weight to 25% by weight, especially 5% by weight to 15% by weight. The range of 5% by weight to 100% by weight can, of course, be exhausted up to its upper limit only in cells according to example 1. All the other closed ranges mentioned may be preferable for any variations. More preferably, however, they apply to cells according to example 1.

Instead of the lower range limits mentioned in the preceding paragraph, the lower limit for the proportion of carbon-based storage material in the ranges mentioned may also be 5.5% by weight, preferably 6% by weight, especially 6.5% by weight.

All the percentages mentioned relate preferably to the total weight of the negative electrode in the dry state (i.e., without electrolyte), minus the weight of the output conductor, which is not taken into account.

If the negative electrode comprises the combination of the carbon-based storage material and the non-carbon-based H2 storage material (in cells according to example 2), the proportion of the H2 storage material in the negative electrode is preferably 25% by weight to 95% by weight, more preferably 50% by weight to 95% by weight, especially preferably 75% by weight to 95% by weight, particularly 85% by weight to 95% by weight.

When the negative electrode comprises the combination of the carbon-based storage material and the iron in metallic form (oxidation state 0) and/or oxidized form (oxidation state 2 or 3) according to example 3, the proportion of the iron in the negative electrode is preferably 25% by weight to 95% by weight, more preferably 50% by weight to 95% by weight, especially preferably 75% by weight to 95% by weight, particularly 85% by weight to 95% by weight.

Here too, all the percentages mentioned relate preferably to the total weight of the negative electrode in the dry state (i.e., without electrolyte), minus the weight of the output conductor.

Useful carbon-based storage material capable of forming an electrical double layer, in cells of all variations, is especially activated carbon and graphene. As is well known, activated carbon is a porous, fine-grain carbon having a very high internal surface area. Particular preference is given to activated carbon having a BET surface area of at least 800 $m^2/g$, preferably of at least 900 $m^2/g$ (determined in each case to DIN ISO 9277)

and/or a capacitance value of at least 60 F/g (determined according to DIN IEC 62391).

Graphene is a carbon polymorph having a two-dimensional structure. A multitude of catenated benzene rings forms a honeycomb-shaped pattern in which every carbon atom is surrounded at an angle of 120° by three further carbon atoms and wherein all carbon atoms are $sp^2$-hybridized. Graphene offers the greatest surface area per unit weight theoretically achievable with carbon and therefore at present is the subject of intensive studies in connection with the development of supercapacitors. Both graphene and activated carbon are additionally capable of storing hydrogen. This is one property that means they are of such great interest as active electrode material for the negative electrode of the cell.

Graphene and activated carbon can also be used in combination with one another. Any mixing ratio is possible.

The H2 storage materials used are preferably hydrogen storage alloys known from the field of nickel-metal hydride batteries. Particular mention should be made in this connection of $AB_2$ alloys and $AB_5$ alloys. Further options are Raney nickel (a catalytically active nickel-aluminum alloy) and metallic nickel of high electrochemical activity (INCO Nickel).

$AB_2$ alloys are generally based on titanium and nickel in an effective ratio of 1:2. In practice, the titanium and the nickel are frequently partly replaced by one or more additions, especially from the group comprising chromium, vanadium or zirconium.

$AB_5$ alloys are usually mixtures of lanthanum and nickel in an effective ratio of 1:5. In practice, the lanthanum and the nickel are frequently partly replaced by one or more additions, especially from the group comprising manganese, nickel, copper, chromium, aluminum, cobalt, zinc, zirconium or cerium.

Alternatively or additionally, instead of the alloys mentioned or in addition thereto, it is also possible to use $A_2B_7$ or $AB_3$ alloys. These alloy types too have already been discussed in connection with nickel-metal hydride batteries. Examples of alloys of this kind are, for example, $La_{16.3}Mg_{7.0}Ni_{65.1}CO_{11.6}$ ($A_2B_7$) or $La_{0.7}Mg_{0.3}Ni_{3-x}Fe_x$ ($AB_3$ with x=0-0.4).

The carbon-based storage material used is preferably in particulate, i.e., pulverulent, form. In the production of the negative electrodes (in all variations), it is especially used in the form of a powder having a mean particle size of 50 nm to 500 μm, especially having a mean particle size of 10 μm to 50 μm.

The H2 storage material used and the iron (in oxidized and reduced form) are likewise preferably in particulate form. In the production of the negative electrodes according to examples 2 and 3, the H2 storage material and the iron are especially used in the form of powders having a mean particle size of 10 nm to 100 μm, especially with a mean particle size of 10 nm to 1 μm.

Positive Electrode

The nickel hydroxide and/or nickel oxyhydroxide is preferably used in the form of spherical particles. Irrespective of this, it may be preferable that the particles of nickel hydroxide and/or nickel oxyhydroxide used have a surface at least partly coated with cobalt.

In general, the positive electrode contains the nickel hydroxide and/or the nickel oxyhydroxide in a proportion of 10% by weight to 100% by weight, preferably 25% by weight to 100% by weight, especially 50% by weight to 100% by weight. These percentages are preferably based on the total weight of the positive electrode in the dry state (i.e., without electrolyte), minus the weight of the output conductor present.

Preferred Structures of the Electrodes

For production of particularly preferred structure of the negative electrode of cells according to examples 1 to 3, the carbon-based storage material in example 1, the carbon-based storage material and the H2 storage material in example 2 and the carbon-based storage material and the iron in example 3 are processed, for example, as a paste. However, one or more further additional components are frequently added to the components mentioned. Accordingly, the negative and positive electrodes of cells according to examples 1 to 3 may optionally include one or more additional components as well as the components mentioned. These additional components will be addressed in more detail hereinafter.

Useful additional components for the negative electrode of cells of all examples are especially at least one of the following components in the following proportions:
- 0.1% by weight to 10% by weight, preferably 1% by weight to 5% by weight, of an electrode binder
- 0.1% by weight to 10% by weight, preferably 1% by weight to 5% by weight, of a conductor.

These additional components may be added to the negative electrode individually or in combination.

When the negative electrode contains neither a proportion of the H2 storage material nor a proportion of the iron (example 1), it more preferably comprises the following components in the following proportions:
- 90% by weight to 99.9% by weight, especially 95% by weight to 99.9% by weight, of the carbon-based storage material
- 0.1% to 10% by weight, preferably 0.1% by weight to 5% by weight, of the electrode binder.

In the presence of a combination of the carbon-based storage material and the non-carbon-based H2 storage material (example 2), the negative electrode, in a development, more preferably comprises the following components in the following proportions:
- 75% by weight to 94.9% by weight, especially 85% by weight to 94.9% by weight, of the H2 storage material
- 5% by weight to 19.9% by weight, especially 5% by weight to 14.9% by weight, of the carbon-based storage material
- 0.1% by weight to 10% by weight, preferably 0.1% by weight to 5% by weight, of the electrode binder.

In the presence of a combination of the carbon-based storage material and the iron (example 3), the negative electrode, more preferably comprises the following components in the following proportions:
- 75% by weight to 94.9% by weight, especially 85% by weight to 94.9% by weight, of the iron
- 5% by weight to 19.9% by weight, especially 5% by weight to 14.9% by weight, of the carbon-based storage material
- 0.1% by weight to 10% by weight, preferably 0.1% by weight to 5% by weight, of the electrode binder.

Useful additional components for the positive electrode are especially the following components in the following proportions:
- 0.1% by weight to 10% by weight, preferably 1% by weight to 5% by weight, of an electrode binder
- 0.1% by weight to 90% by weight, preferably 0.1% by weight to 50% by weight, more preferably 0.1% by weight to 40% by weight, especially 0.1% by weight to 20% by weight, of a conductor
- a carbon-based storage material which enables the storage of electrical charge in the electrode through formation of an electrical double layer (Helmholtz double layer), especially in a proportion of 0.1% by weight to 20% by weight.

These components can be added to the positive electrode individually or in combination.

The positive electrode more preferably comprises the following components in the following proportions:
- 50% by weight to 99.8% by weight of nickel hydroxide and/or nickel oxyhydroxide
- 0.1% by weight to 40% by weight, preferably 0.1% by weight to 45% by weight, of the conductor
- between 0.1% by weight to 10% by weight, preferably 0.1% by weight to 5% by weight, of the electrode binder.

It is preferably also the case for all these preferred examples that the percentages are each based on the total weight of the positive electrode and the negative electrode in the dry state (i.e., without electrolyte), minus the weight of the respective output conductor.

It is further preferable that the percentages of the respective components present in all the specified compositions and in all compositions derivable from the above specifications for the positive electrode and negative electrode add up to 100% by weight.

The conductor is preferably a metal powder, especially a nickel and/or cobalt powder. Alternatively or additionally, it is also possible to use carbon-based conductors such as carbon black, graphite, carbon nanotubes (CNTs), nanocarbons or, in the case of the positive electrode, graphene as well.

The electrode binder used is preferably a cellulose-based binder, for example, carboxymethyl cellulose or a derivative of carboxymethyl cellulose. Also particularly suitable are water-soluble cellulose ethers, for example, methyl hydroxyethyl cellulose (MHEC), methyl hydroxypropyl cellulose (MHPC) and hydroxyethyl cellulose (HEC). Alternative options include polyacrylates or polymer-based binders, for example, PTFE binders (PTFE=polytetrafluoroethylene) or binders based on SBR (styrene-butadiene rubber).

The electrodes of the cells need not necessarily contain an electrode binder. They may also be manufactured, for example, in binder-free form as sintered electrodes or as compacts.

Useful materials for the carbon-based storage material which, in preferred structures, may be present in the positive electrode include the same materials as in the case of the negative electrode. These are, in particular, activated carbon having the abovementioned properties and graphene.

As well as the additions mentioned, the positive electrode and/or the negative electrode may contain further additions. Particular mention should be made by way of example in this connection of cobalt oxide, cobalt hydroxide, iron sulfide, potassium sulfide, zinc sulfate, ammonium carbonate or calcium hydroxide.

Output Conductor

Preferably, the output conductor of the positive electrode and/or the negative electrode forms a three-dimensional conductive matrix into which the respective storage material is embedded on the anode side and the nickel hydroxide and/or nickel oxyhydroxide on the cathode side (applies to cells of all examples).

Preferably, output conductors used on the positive electrode side and/or negative electrode side are metallic or metal-coated open-pore foams or output conductors made from a metallic or metal-coated nonwoven. Output conductors of this kind are conventionally used particularly on the positive electrode side of nickel-cadmium or nickel-metal hydride accumulators in button cell form. Reference is made by way of example in this connection to EP 0 658 949 A1. Both the foams mentioned and the nonwovens mentioned are commercially available. They preferably consist of nickel or copper or have been coated with one of these metals.

Particularly preferably, an output conductor that forms a three-dimensional conductive matrix, especially in the form of a foam or nonwoven, coated with copper or consisting of copper is used on the negative electrode side, while a thin foil of steel or stainless steel, especially of nickel-coated steel or stainless steel, is used on the positive electrode side.

In some examples, it may be preferable that a three-dimensional output conductor made from the foam or nonwoven mentioned is used only on the negative electrode side, while a flat, two-dimensional output conductor, for example, a metal foil or a metal mesh, is used on the positive electrode side. In this case, the positive electrodes are usually produced via a sintering method.

Of course, it may also be preferable to use a flat, two-dimensional output conductor, for example, a metal foil, in place of the three-dimensional output conductors on the positive electrode side and/or the negative electrode side.

In the presence of a combination of the carbon-based storage material and the non-carbon-based H2 storage material (example 2) or the iron (example 3), the particles of the carbon-based storage material and of the iron or of the H2 storage material are present in the negative electrode, and in preferred structures in the aforementioned three-dimensional matrix composed of the output conductor, preferably in a homogeneous distribution. This is attributable particularly to the aforementioned mixing of the respective components of the negative electrode. To achieve such an arrangement, the H2 storage material or the iron and the carbon-based storage material may be processed to give a mixture, especially the paste already mentioned, optionally with addition of at least one of the additional components described. Vigorous mixing of the components ensures that all components of the mixture are in uniform, homogeneous distribution. Subsequently, the mixture, especially the paste, is introduced into the aforementioned three-dimensional matrix composed of an output conductor or applied in the form of a thin layer to a two-dimensional output conductor.

In some examples, however, it may also be preferable that the negative electrode has a first subregion, especially a first layer, in which the carbon-based storage material is enriched and, correspondingly, a second subregion, especially a second layer, in which the non-carbon-based H2 storage material or the iron is enriched. To achieve such an arrangement, the H2 storage material or the iron and the carbon-based storage material are generally not processed in one step. For example, it is possible in a first step to introduce the H2 storage material or the iron into the aforementioned three-dimensional matrix composed of an output conductor and then to coat the output conductor on its exterior with the carbon-based storage material or in a first step to introduce the H2 storage material or the iron into an output conductor strip composed of a nickel foam and then to arrange a layer of the carbon-based storage material on one side or even both sides of the strip.

Preferably, the negative electrode of the electrochemical cell may thus have a multilayer structure, especially a bilayer structure. In this case, for example, the output conductor and the iron together form the second layer mentioned, whereas the carbon-based storage material forms the first layer mentioned.

Separator/Electrode-Separator Composite

Both the separator and the positive electrode and the negative electrode are preferably in the form of thin layers. They may be provided, for example, in the form of ribbons or flat strips. In the case of the electrodes, layers having a thickness of 50 µm to 500 µm are preferred. The thickness of the separator used is preferably 10 µm to 100 µm.

The separator of the electrochemical cells is preferably a porous polymer film, especially a film of a polyolefin, of PEEK (polyether ether ketone) or of PES (polyether sulfone). However, it is also possible without difficulty to use separators made of paper or made of a nonwoven. Basically, what is required is merely that the separator has sufficient porosity to be penetrated by the electrolyte and that it is stable with respect thereto.

The cells are preferably in the form of a composite having the layer sequence of positive electrode/separator/negative electrode. More preferably, the electrochemical cell may be in the form of a bicell, i.e., having the layer sequence of positive electrode/separator/negative electrode/separator/positive electrode or negative electrode/separator/positive electrode/separator/negative electrode.

When the negative electrode, as set out above, has a first layer in which the carbon-based storage material is enriched, it is preferable that this layer is arranged between the negative electrode and an adjacent separator.

The electrodes of the electrochemical cell are preferably calendered before they are combined with one another and with the separator.

The composite having the layer sequence of positive electrode/separator/negative electrode, in some preferred examples, is in the form of a spiral coil. For production of such a spiral coil, it is possible, for example, to combine a positive electrode ribbon and a negative electrode ribbon with two separator ribbons by a lamination or bonding operation to give a composite having the sequence of separator/negative electrode/separator/positive electrode and then to roll it up.

Cell Composite/Bipolar Arrangement

Two or more of the cells described can be used to form a cell composite. Within the composite, the cells may be connected in parallel to one another or in series. In the balancing of such a cell composite, the high overcharge stability mentioned may be found to be particularly advantageous. To bring all the cells in the composite back to an identical voltage level, the cell composite can be deliberately overloaded. This is generally not possible without irreparably damaging at least individual cells in the composite. Because of the carbon-based storage material in the negative electrodes of the cells, which can contribute to consumption of oxygen produced in the overcharging, in the present case, the risk of such damage, however, is minimized. This is especially true when one or more of the cells, preferably all the cells, in the composite have the auxiliary electrode mentioned.

Of course, it is also possible to stack two or more electrochemical cells composed of positive electrode and negative electrode and of one or more separators one on top of another. One possible construction of a corresponding stack is described, for example, in EP 1 011 163 A1.

Preferably, two or more cells are combined with one another in a bipolar arrangement. It is a feature of a bipolar arrangement of electrochemical cells that individual electrochemical cells function as subcells and are connected in series by conductive intermediate walls. Each subcell has a positive electrode and a negative electrode separated from one another by an electrolyte-soaked separator. There is a connecting wall between adjacent subcells. This establishes an electrical connection between the positive electrode of one cell and the negative electrode of the other cell. At the same time, it separates the electrolyte spaces of the subcells from one another.

Housing

The housing of the cells may take the form, for example, of a button cell housing, especially of the housing as described in the already mentioned EP 1 011 163 A1. Alternatively, the cells may also take the form of flat cells, as described, for example, in EP 1 391 947 A1. In this case, the housing thereof is formed from thin metal foils bonded to one another via a sealing layer.

Especially when the above-described composite having the layer sequence of positive electrode/separator/negative electrode is in the form of a spiral coil, the housing may also take the form of a cylindrical round cell housing.

More preferably, the housing of the cells is a metallic housing, for example, a housing made from stainless steel or from a nickel-plated steel or stainless steel.

Electrolyte

The aqueous electrolyte of the electrochemical cells preferably includes at least one hydroxide compound in dissolved form in the range of 0.1 M to 10 M. More preferably, the electrolyte comprises at least one metal hydroxide as hydroxide compound, especially sodium hydroxide, lithium hydroxide or potassium hydroxide.

More preferably, the electrolyte comprises, in addition to the hydroxide compound, at least one sulfate compound, especially an alkali metal or alkaline earth metal sulfate. The at least one sulfate compound is preferably present in the electrolyte in a concentration of 0.001% by weight to 0.1% by weight.

Preferably, the electrolyte contains a secondary conductive salt having $PO_4^{3-}$, $NO_3^-$ or $Cl^-$ anions and metallic counterions.

It is additionally also possible to add additives to the electrolyte, for example, thickeners, corrosion inhibitors, wetting agents and antifreezes.

More preferably, the electrolyte comprises, as additive, a nonylphenol ethoxylate (NPEO). In general, NPEOs refer to a group of nonionic surfactants which derive from nonylphenols and differ in the number of hydrophilic ethoxy units in the polyethylene glycol side chain. Particular preference is given to NPEOs of the formula

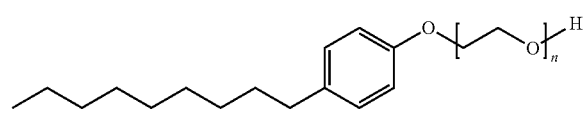

with n=1 to 50, preferably with n=1-25, more preferably with n=1 to 10, especially with n=2 to 6. We found that, surprisingly, the addition of NPEOs leads to an improvement in the activation characteristics, to improved low-temperature performance and quite generally to enhanced performance of the electrodes of cells according to examples 1 to 3. Particular emphasis should further be given to a distinct improvement in the stability of cells having alkaline electrolyte. As additives, NPEOs seem to increase the breakdown voltage of KOH, and do so even in relatively low concentrations.

More preferably, the NPEO is present in a concentration of 0.001% by weight to 0.1% by weight in the electrolyte, preferably 0.001% by weight to 0.1% by weight.

Voltage Window

Cells according to example 2 preferably have a voltage window (working range of the cells in regular operation) of 0.6-1.5 V.

The cells of all variations exhibit excellent high-temperature characteristics. The cells generally withstand storage at 105° C. for two hours without difficulty (no swelling of the housing or even leaks). In principle, even discharge is possible at these temperatures.

Working Examples (1) Production of an Electrochemical Cell According to Example 2

To form positive electrodes, an aqueous active material paste was applied to an open-pore nickel foam. The solids content of the paste was composed of the following components:
  90% by weight of $Ni(OH)_2$
  4% by weight of cobalt powder as conductor
  4% by weight of carbon black as further conductor
  2% by weight of a water-soluble cellulose ether as binder.

To form negative electrodes, an aqueous active material paste was applied to an open-pore nickel foam. The solids content of the paste was composed of the following components:
  7.5% by weight of activated carbon having a BET surface area of >900 $m^2/g$
  90% by weight of an $A_2B_7$ alloy
  2.5% by weight of a water-soluble cellulose ether as binder The electrodes were each dried and subjected to a rolling operation. Thereafter, they had a thickness of about 250 μm.

On one side of the negative electrode, a mixture of activated carbon, carbon black and polytetrafluoroethylene (PTFE) was subsequently applied by rolling in a thickness of 50 μm to 100 μm as an auxiliary electrode for dissipation of any oxygen pressure that arises in the housing. The exact composition was 75% by weight of activated carbon, about 7.5% by weight of conductive black and about 17.5% by weight of PTFE.

Subsequently, the electrodes were combined with a polypropylene separator (nonwoven, thickness 80 μm) to give an electrode-separator composite having the following layer sequence:
  auxiliary electrode/negative electrode/separator/positive electrode.

The composite was soaked with an aqueous electrolyte (6 M KOH solution) and installed in a housing made of nickel-plated stainless steel, as shown in FIG. 1.

The cell thus produced had a voltage window of 0.8-1.5 V.

(2) Production of an Electrochemical Cell According to Example 1

To form positive electrodes, an aqueous active material paste was applied to an open-pore nickel foam. The solids content of the paste was composed of the following components:
  50% by weight of $Ni(OH)_2$
  8% by weight of carbon black as conductor
  40% by weight of graphite as further conductor
  2% by weight of a water-soluble cellulose ether as binder.

To form negative electrodes, an aqueous active material paste was applied to an open-pore nickel foam. The solids content of the paste was composed of the following components:
  97.5% by weight of activated carbon having a BET surface area of >900 $m^2/g$
  2.5% by weight of a water-soluble cellulose ether as binder.

On one side of the negative electrode, a mixture of activated carbon, carbon black and polytetrafluoroethylene (PTFE) was subsequently applied by rolling in a thickness of 50 μm to 100 μm as an auxiliary electrode for dissipation of any oxygen pressure that arises in the housing. The exact composition was 75% by weight of activated carbon, about 7.5% by weight of conductive black and about 17.5% by weight of PTFE.

Subsequently, the electrodes were combined with a polypropylene separator (nonwoven, thickness 80 μm) to give an electrode-separator composite having the following layer sequence:
auxiliary electrode/negative electrode/separator/positive electrode.

The composite was soaked with an aqueous electrolyte (6 M KOH solution) and installed in a housing made of nickel-plated stainless steel, as shown in FIG. 1.

The cell thus produced had a voltage window of 0-1.6 V.

(3) Production of a Further Electrochemical Cell According to Example 2

To form positive electrodes, an aqueous active material paste was applied to an open-pore nickel foam. The solids content of the paste was composed of the following components:
60% by weight of $Ni(OH)_2$
8% by weight of carbon black as conductor
30% by weight of graphite as further conductor
2% by weight of a water-soluble cellulose ether as binder.

To form negative electrodes, an aqueous active material paste was applied to an open-pore nickel foam. The solids content of the paste was composed of the following components:
87.5% by weight of activated carbon having a BET surface area of >900 $m^2/g$
10% by weight of an $A_2B_7$ alloy
2.5% by weight of a water-soluble cellulose ether as binder.

On one side of the negative electrode, a mixture of activated carbon, carbon black and polytetrafluoroethylene (PTFE) was subsequently applied by rolling in a thickness of 50 μm to 100 μm as an auxiliary electrode for dissipation of any oxygen pressure that arises in the housing. The exact composition was 75% by weight of activated carbon, about 7.5% by weight of conductive black and about 17.5% by weight of PTFE.

Subsequently, the electrodes were combined with a polypropylene separator (nonwoven, thickness 80 μm) to give an electrode-separator composite having the following layer sequence:
auxiliary electrode/negative electrode/separator/positive electrode.

The composite was soaked with an aqueous electrolyte (6 M KOH solution) and installed in a housing made of nickel-plated stainless steel, as shown in FIG. 1.

The cell thus produced had a voltage window of 0.6-1.5 V.

(4) Production of an Electrochemical Cell According to Example 3

To form positive electrodes, an aqueous active material paste was applied to an open-pore nickel foam. The solids content of the paste was composed of the following components:
80% by weight of $Ni(OH)_2$
4% by weight of cobalt powder as conductor
14% by weight of nickel powder as further conductor
2% by weight of a water-soluble cellulose ether as binder.

To form negative electrodes, an aqueous active material paste was applied to an open-pore nickel foam. The solids content of the paste was composed of the following components:
20% by weight of activated carbon having a BET surface area of >900 $m^2/g$
74.5% by weight of iron particles (at least partly oxidized to $Fe(OH)_2$) having a mean particle size of 100 nm to 200 nm
5% by weight of SBR as binder
0.5% by weight of a further water-soluble CMC binder/thickener.

On one side of the negative electrode, a mixture of activated carbon, carbon black and polytetrafluoroethylene (PTFE) was subsequently applied by rolling in a thickness of 50 μm to 100 μm as an auxiliary electrode for dissipation of any oxygen pressure that arises in the housing. The exact composition was 75% by weight of activated carbon, about 7.5% by weight of conductive black and about 17.5% by weight of PTFE.

Subsequently, the electrodes were combined with a polypropylene separator (nonwoven, thickness 80 μm) to give an electrode-separator composite having the following layer sequence:
auxiliary electrode/negative electrode/separator/positive electrode.

The composite was soaked with an aqueous electrolyte (6 M KOH solution) and installed in a housing made of nickel-plated stainless steel, as shown in FIG. 1.

The cell thus produced had a voltage window of 0.6-1.5 V.

(5) Production of a Further Electrochemical Cell According to Example 3

To form positive electrodes, an aqueous active material paste was applied to an open-pore nickel foam. The solids content of the paste was composed of the following components:
60% by weight of $Ni(OH)_2$
32% by weight of activated carbon
3% by weight of carbon black as conductor
3% by weight of $Ca(OH)2$ as additive
2% by weight of a water-soluble cellulose ether as binder.

To form negative electrodes, an aqueous active material paste was applied to an open-pore nickel foam. The solids content of the paste was composed of the following components:
87.0% by weight of activated carbon having a BET surface area of >900 $m^2/g$
10% by weight of iron particles (at least partly oxidized to $Fe(OH)_2$) having a mean particle size of 100 to 200 nm
2.5% by weight of a water-soluble SBR binder
0.5% by weight of a further water-soluble CMC binder/thickener.

On one side of the negative electrode, a mixture of activated carbon, carbon black and polytetrafluoroethylene (PTFE) was subsequently applied by rolling in a thickness of 50 μm to 100 μm as an auxiliary electrode for dissipation of any oxygen pressure that arises in the housing. The exact composition was 75% by weight of activated carbon, about 7.5% by weight of conductive black and about 17.5% by weight of PTFE.

Subsequently, the electrodes were combined with a polypropylene separator (nonwoven, thickness 80 μm) to give an electrode-separator composite having the following layer sequence:

auxiliary electrode/negative electrode/separator/positive electrode.

The composite was soaked with an aqueous electrolyte (6 M KOH solution) and installed in a housing made of nickel-plated stainless steel, as shown in FIG. 1.

The cell thus produced had a voltage window of 0.6-1.5 V.

FIG. 1 shows, in schematic form, construction of an example of an electrochemical element. Disposed in a housing composed of the housing parts 1 and 2 is a composite composed of a positive electrode 4, a separator 6 and a negative electrode 5. The housing is sealed liquid- and gas-tight by the seal 3. On the side of the negative electrode remote from the separator, the auxiliary electrode 7 has been applied by rolling. By the spring 8, volumetric changes in the composite as a result of charging and discharging operations are to be balanced out.

Figure 2:
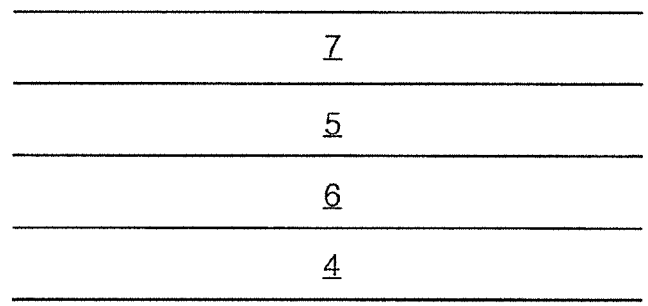
FIG. 2 shows, in schematic form, an electrode-separator composite producible according to the working examples.

FIG. 2 shows, in schematic form, an electrode-separator composite producible according to the working examples. A positive electrode layer bears the reference numeral 4, a negative electrode layer the reference numeral 5, the separator the reference numeral 6 and an auxiliary electrode layer the reference numeral 7.

Figure 3:
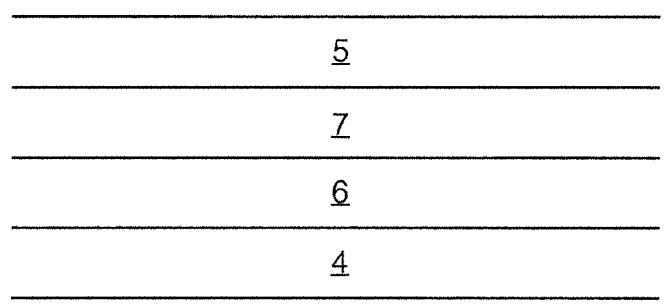
FIG. 3 shows, in schematic form, an alternative electrode-separator composite of one example of an electrochemical element.

FIG. 3 shows, in schematic form, an alternative electrode-separator composite of one example of an electrochemical element. Here too, a positive electrode layer bears the reference numeral 4, a negative electrode layer the reference numeral 5, the separator the reference numeral 6 and an auxiliary electrode layer the reference numeral 7. In contrast with the example according to FIG. 2, the auxiliary electrode 7 here is arranged between the negative electrode 5 and the separator 6.

Figure 4:
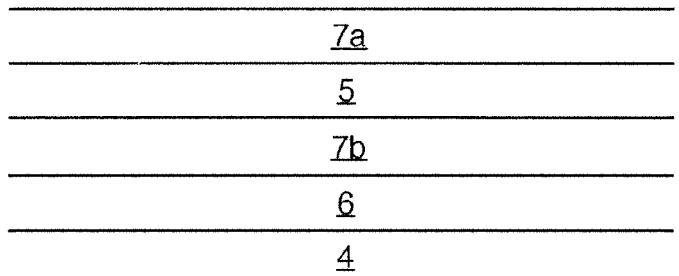
FIG. 4 shows, in schematic form, a further alternative electrode-separator composite in an example of an electrochemical element.

FIG. 4 shows, in schematic form, a further alternative electrode-separator composite in an example of an electrochemical element. Here too, a positive electrode layer bears the reference numeral 4, a negative electrode layer the reference numeral 5 and the separator the reference numeral 6. However, auxiliary electrodes with reference numerals 7*a* and 7*b* are arranged on two opposite sides of the negative electrode 5.

The invention claimed is:

1. A secondary electrochemical cell comprising:
    a negative electrode comprising
        an output conductor,
        at least 5% by weight of a carbon-based storage material that enables storage of electrical charge in the electrode through formation of an electrical double layer (Helmholtz double layer), wherein the carbon-based storage material is activated carbon having a BET surface area of at least 800 m$^2$/g, and
        at least one non-carbon-based H2 storage material selected from the group consisting of $AB_2$, $AB_5$, $A_2B_7$ and $AB_3$ alloys and can chemisorb hydrogen and/or store it as a metal hydride,
        wherein the carbon-based storage material and the H2 storage material are homogenously distributed in the negative electrode,
    a positive electrode containing
        an output conductor, and
        nickel hydroxide and/or nickel oxyhydroxide,
    a porous separator that separates the negative electrode and the positive electrode from one another,
    an aqueous alkaline electrolyte with which the electrodes and the separator are soaked, and
    a housing that encases the electrodes, the separator and the electrolyte.

2. The secondary electrochemical cell as claimed in claim 1, further comprising an auxiliary electrode electrically connected to the negative electrode to dissipate any oxygen pressure arising in the housing.

3. The secondary electrochemical cell as claimed in claim 1, wherein the positive electrode has a lower capacity than the negative electrode.

4. The secondary electrochemical cell as claimed in claim 1, wherein the housing has a gas- and liquid-tight configuration.

5. The secondary electrochemical cell as claimed in claim 1, wherein the proportion of the H2 storage material in the negative electrode is 50% by weight to 95% by weight.

6. The secondary electrochemical cell as claimed in claim 1, wherein the positive electrode contains the nickel hydroxide and/or nickel oxyhydroxide in a proportion of 10% by weight to 100% by weight.

7. The secondary electrochemical cell as claimed in claim 1, wherein the carbon-based storage material and/or the H2 storage material are homogeneously distributed in the negative electrode.

8. The secondary electrochemical cell as claimed in claim 1, wherein the negative electrode has a first subregion in which the carbon-based storage material is enriched, and a second subregion in which the H2 storage material is enriched.

9. The secondary electrochemical cell as claimed in claim 8, wherein the carbon-based storage material has been applied to an exterior of the output conductor of the negative electrode.

10. The secondary electrochemical cell as claimed in claim 1, wherein the positive electrode and/or negative electrode are layers having a thickness of 50 μm to 500 μm.

11. The secondary electrochemical cell as claimed in claim 1, wherein the aqueous electrolyte contains a dissolved hydroxide compound in a proportion of 0.1 M to 10 M and optionally includes a sulfate compound in a concentration of 0.001% to 0.1% by weight.

12. A method of charging the electrochemical cell as claimed in claim 1, wherein, during a charging operation, the ambient temperature and/or the temperature of the electrochemical element is measured and, upon exceeding a selected temperature threshold, the loading voltage is lowered by a value of 0.6 mV/° C. to 1.8 mV/° C.

13. The secondary electrochemical cell as claimed in claim 1, wherein the output conductor of the negative electrode comprises a metallic or metal-coated open-pore foam, a metallic or metal-coated nonwoven, or a metal foil.

14. The secondary electrochemical cell as claimed in claim 1, wherein the output conductor of the positive electrode comprises a metallic or metal-coated open-pore foam, a metallic or metal-coated nonwoven, or a metal foil.

15. A secondary electrochemical cell comprising:
    a negative electrode comprising
        an output conductor,
        at least 5% by weight to 15% by weight of a carbon-based storage material that enables storage of electrical charge in the electrode through formation of an electrical double layer (Helmholtz double layer), wherein the carbon-based storage material is activated carbon having a BET surface area of at least 800 m$^2$/g, and
        at least one non-carbon-based H2 storage material selected from the group consisting of $AB_2$ $AB_5$, $A_2B_7$ and $AB_3$ alloys and can chemisorb hydrogen and/or store it as a metal hydride, wherein the carbon-based storage material and the H2 storage material are homogenously distributed in the negative electrode,
a positive electrode containing
an output conductor, and
nickel hydroxide and/or nickel oxyhydroxide,
a porous separator that separates the negative electrode and the positive electrode from one another,
an aqueous alkaline electrolyte with which the electrodes and the separator are soaked, and
a housing that encases the electrodes, the separator and the electrolyte.

16. A secondary electrochemical cell comprising:
a negative electrode comprising
an output conductor,
at least 5% by weight of a carbon-based storage material that enables storage of electrical charge in the electrode through formation of an electrical double layer (Helmholtz double layer), wherein the carbon-based storage material is activated carbon having a BET surface area of at least 800 m$^2$/g, and
a non-carbon-based H2 storage material that is an $A_2B_7$ alloy and can chemisorb hydrogen and/or store it as a metal hydride,
a positive electrode containing
an output conductor, and
nickel hydroxide and/or nickel oxyhydroxide,
a porous separator that separates the negative electrode and the positive electrode from one another,
an aqueous alkaline electrolyte with which the electrodes and the separator are soaked, and
a housing that encases the electrodes, the separator and the electrolyte.

* * * * *